United States Patent
Kech

(10) Patent No.: US 10,876,880 B2
(45) Date of Patent: Dec. 29, 2020

(54) FILLING MATERIAL VOLUME DETECTION SYSTEM COMPRISING MULTIPLE RADAR SENSORS

(71) Applicant: VEGA GRIESHABER KG, Wolfach (DE)

(72) Inventor: Guenter Kech, Wolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 222 days.

(21) Appl. No.: 15/765,755

(22) PCT Filed: Sep. 19, 2016

(86) PCT No.: PCT/EP2016/072163
§ 371 (c)(1),
(2) Date: Apr. 4, 2018

(87) PCT Pub. No.: WO2017/060064
PCT Pub. Date: Apr. 13, 2017

(65) Prior Publication Data
US 2018/0283926 A1 Oct. 4, 2018

(30) Foreign Application Priority Data

Oct. 6, 2015 (DE) .......... 10 2015 219 276

(51) Int. Cl.
*G01F 23/284* (2006.01)
*G01F 22/00* (2006.01)
(Continued)

(52) U.S. Cl.
CPC .......... *G01F 23/284* (2013.01); *G01B 15/04* (2013.01); *G01F 22/00* (2013.01);
(Continued)

(58) Field of Classification Search
CPC .... G01F 23/284; G01F 23/0076; G01F 23/28; G01F 22/00; G01S 13/89; G01S 7/003;
(Continued)

(56) References Cited

U.S. PATENT DOCUMENTS 5,163,323 A  11/1992 Davidson
7,408,501 B2  8/2008 Rolfes et al.
(Continued)

FOREIGN PATENT DOCUMENTS

CN  202 770 498 U  3/2013
CN  103245395 A  8/2013
(Continued)

OTHER PUBLICATIONS

International Search Report dated Jan. 17, 2017 in PCT/EP2016/072163 filed Sep. 19, 2016.
(Continued)

*Primary Examiner* — Frank J McGue
(74) *Attorney, Agent, or Firm* — Oblon, McClelland, Maier & Neustadt, L.L.P.

(57) ABSTRACT

A fill level measurement system for detecting a topology of a filling material surface or a volume of a filling material in a container including a master device and one or more slave devices, the master device being designed to transmit control signals to the slave device. As the slave devices do not include all the functionalities of an independent fill level measurement device, the slave devices can be produced in a cost-effective manner.

13 Claims, 1 Drawing Sheet

(51) Int. Cl.
    *G01S 13/88*     (2006.01)
    *G01S 7/00*     (2006.01)
    *G01S 13/87*     (2006.01)
    *G01F 23/00*     (2006.01)
    *G01F 23/28*     (2006.01)
    *G01S 13/89*     (2006.01)
    *G01B 15/04*     (2006.01)

(52) U.S. Cl.
    CPC .......... *G01F 23/0076* (2013.01); *G01F 23/28* (2013.01); *G01S 7/003* (2013.01); *G01S 13/87* (2013.01); *G01S 13/88* (2013.01); *G01S 13/89* (2013.01)

(58) Field of Classification Search
    CPC .......... G01S 13/87; G01S 13/88; G01S 13/42; G01B 15/04
    USPC ......................................................... 342/124
    See application file for complete search history.

(56) References Cited

U.S. PATENT DOCUMENTS

| | | | |
|---|---|---|---|
| 9,091,753 | B2 | 7/2015 | Deilmann et al. |
| 2006/0192671 | A1* | 8/2006 | Isenmann ............ G05B 19/042 340/531 |
| 2009/0088987 | A1 | 4/2009 | Lyon |
| 2009/0322593 | A1 | 12/2009 | Hall et al. |
| 2012/0281096 | A1 | 11/2012 | Gellaboina et al. |
| 2013/0278306 | A1* | 10/2013 | Wixforth ................ G01S 13/42 327/141 |
| 2014/0150549 | A1 | 6/2014 | Rieger |
| 2015/0103628 | A1 | 4/2015 | Bartov et al. |
| 2015/0103630 | A1 | 4/2015 | Bartov et al. |

FOREIGN PATENT DOCUMENTS

| | | |
|---|---|---|
| CN | 104599468 A | 5/2015 |
| DE | 10 2011 002 038 B3 | 3/2012 |
| EP | 0 626 569 A1 | 11/1994 |
| EP | 0 720 732 B1 | 9/1999 |
| EP | 1 854 251 | 11/2007 |
| EP | 2 180 299 A1 | 4/2010 |
| EP | 3088862 * | 4/2016 |
| GB | 2 190 501 A | 11/1987 |
| RU | 661244 A1 | 5/1979 |
| RU | 1695140 A1 | 11/1991 |
| RU | 2 178 151 C1 | 1/2002 |
| RU | 2013 114 357 A | 10/2014 |
| WO | 2006/089760 A1 | 8/2006 |
| WO | WO 2015/052698 A1 | 4/2015 |

OTHER PUBLICATIONS

Combined Chinese Office Action and Search Report dated Jul. 16, 2019 in Patent Application No. 201680057678.0 (with English translation of Categories of Cited Documents), 11 pages.

Russian Federation Search Report dated Jan. 28, 2020 in Patent Application No. 2018116413/28(025557) (with English translation of categories of cited documents), 3 pages.

Office Action dated Oct. 21, 2020 in China Patent Application No. 201680057678.0 (with English-language translation); 27 pgs.

* cited by examiner

FILLING MATERIAL VOLUME DETECTION SYSTEM COMPRISING MULTIPLE RADAR SENSORS

FIELD OF THE INVENTION

The invention relates to fill level measurement. In particular, the invention relates to a fill level measurement system for detecting a topology of a filling material surface or a volume of a filling material in a container, to a method for detecting a topology of a filling material surface or a volume of a filling material in a container, to a program element and to a computer-readable medium.

BACKGROUND

In order to determine the topology of a filling material surface, which is also referred to as a surface contour, or in order to determine the volume of a bulk material, a fill level measurement device can be used that scans the surface of the filling material. Alternatively, an arrangement consisting of a plurality of fill level measurement devices can be used, from the measurement data of which the topology of the filling material surface or the filling material volume can be determined. These extensive measurement systems are often complex and expensive.

SUMMARY OF THE INVENTION

The object of the invention is to provide an efficient, flexible and cost-effective measurement system for detecting a topology of a filling material surface or a volume of a filling material in a container.

This object is achieved by the features of the independent claims. Developments of the invention can be found in the dependent claims and the following description.

A first aspect of the invention relates to a fill level measurement system for detecting a topology of a filling material surface or a volume of a filling material in a container, which system comprises a first and at least a second fill level measurement device. The first fill level measurement device is a fill level measurement device designed as a master device and the second fill level measurement device(s) is/are measurement devices designed as slave devices, each of which are to be connected to the master device at a physical distance from the master device. In this case, the master device is designed to transmit control signals to the slave device(s) in order to control the slave device(s).

At this point, it should be noted that, if only one slave device is discussed in the following, a plurality of corresponding slave devices may also be provided. The master device may in particular be designed to be connected (in series and/or in parallel) to a large number of slave devices and in particular to establish (by communicating with the corresponding slave devices) how many slave devices are connected to the master device.

The master device is designed to perform tasks that the slave device cannot perform independently. These additional tasks may be, for example, coordinating the entire measurement activity of the system, and at least parts of the subsequent evaluation activity. The master device is responsible in particular for controlling the temporal sequence of the measurement activity of the system. The master device may also take over the evaluation and management of the measured data of the slave devices completely or at least in part.

The master device may also trigger a measurement by means of the corresponding slave device.

The slave device is therefore dependent on the master device and is not a "stand-alone device" that can be used for fill level measurement without a master device. It is therefore possible to produce the slave devices in a more cost-effective manner than previously, as the slave devices are "slimmed-down" measurement devices that are not capable of completely independently controlling measurement tasks or completely evaluating the received echo curves. "Completely evaluating" is understood in this context to mean in particular detecting the topology of the surface and/or calculating the bulk material volume located beneath the sensors.

The master device and the slave device may be defined in their respective roles by corresponding software configurations. In this case, the master device and the slave device do not differ from one another either with regard to their hardware or with regard to their device firmware.

The master device and the slave devices may be fill level radar devices that radiate into free space or fill level measurement devices according to the principle of guided microwaves. In principle, however, it is also possible that these measurement devices are ultrasound sensors or laser sensors. Individual sensors may also be combined with various measurement principles inside a measurement system.

The fill level measurement system is capable of determining the surface contour (topology) and/or the volume in a bulk material bunker by using a plurality of physically separated fill level measurement devices, one of the measurement devices functioning as a master and taking over control and evaluation of the signals of all the other measurement devices (slaves).

According to an embodiment of the invention, the master device is connected to an external energy supply that is formed, for example, as a two-wire loop. In this case, the master device is designed to supply energy to the slave device. For example, the master device may be designed to be the sole supplier of energy to the slave device, i.e. the different slave devices integrated in the system do not have a separate energy supply. The energy provided from the master device can be supplied to various slave devices and it can be provided that a specific slave device is always supplied with energy from the master device exactly when said slave device requires energy. Excess energy may also be supplied from one slave device to another slave device if the other slave device in each case has a corresponding energy requirement.

The slave devices may comprise energy stores in the form of storage capacitors or batteries, which are charged before the corresponding slave device carries out a fill level measurement.

According to a further embodiment of the invention, the control signals that are transmitted from the master device to the slave device are designed to initiate, i.e. to trigger, a measurement by means of the corresponding slave device. The slave devices are therefore not capable of independently deciding whether or not a measurement has to take place, but rather are instructed before each measurement by the master device to carry out a measurement.

Additionally, when the master device instructs the slave device to carry out a measurement, the next step may then be to ensure that the energy store of the slave device is also sufficiently full for the measurement to be carried out correctly. Only when this is the case is the measurement actually carried out. This functionality may be taken over by the slave device.

According to a further embodiment of the invention, the slave device is designed to detect an echo curve, from which the distance between the slave device and the filling material surface can be determined. Furthermore, the slave device is designed to transmit either the complete echo curve, a part thereof or data derived therefrom by the slave device to the master device. The data derived from the echo curve may be, for example, the position of the echo that can be derived from the echo curve and the amplitude thereof. This can reduce the data transfer between slave devices and the master device.

In particular, a slave device may transmit one echo curve or the data derived therefrom to the master device only if said slave device has established that the fill level (or another parameter of interest of the echo curve, such as the amplitude of the filling material echo) has changed by a specific amount, for example by 2 cm (or by 30% or 50% in the case of the amplitude). This can prevent echo curves or other data from being sent from the slave device to the master device, if this is not necessary, as the fill level has not changed at all or has changed only negligibly. This can also reduce the data transfer between the master device and slave devices.

According to a further embodiment of the invention, the master device is also designed to detect an echo curve, from which the distance between the master device and the filling material surface can be determined. The master device can furthermore calculate the topology of the filling material surface and/or the volume of the filling material from the echo curves transmitted from all the slave devices or the data derived therefrom by the slave devices and from the separate detected echo curve.

According to a further embodiment of the invention, both the master device and the slave device each comprise a separate position sensor, from the measured data of which the positions of the devices can be determined. In this case, the slave device is designed to transmit its position data, which are determined from the measured data of the position sensor, to the master device.

The master device receives the position data sent by all the slave devices, which data are then taken into consideration when the topology or the volume of the filling material is being calculated. It is therefore not necessary for a user to manually input the position of the corresponding slave device, as said position is determined by the position sensor, which is a GPS receiver for example.

According to a further embodiment of the invention, the slave device is designed to automatically determine and transmit its position data to the master device as soon as said slave device is connected to the master device and put into operation. This ensures that the master device knows the positions of the slave devices if it contains the echo curves of said slave devices or data derived from said echo curves.

A further aspect of the invention relates to a method for detecting a topology of a filling material surface or a volume of a filling material in a container. Control signals are transmitted from a master device to a plurality of slave devices in order to control the slave devices. Both the master device and the slave devices are fill level measurement devices, for example fill level radar sensors.

Accordingly, each device, i.e. both the master device and each of the slave devices, detects an echo curve from which the corresponding distance between the slave device or master device and the filling material surface is determined. This determining process takes place either by means of the corresponding slave device or centrally in the master device.

After the data has been detected, the detected echo curves or the data derived therefrom by the corresponding slave device are transmitted to the master device, whereupon the topology of the filling material surface or the volume of the filling material is calculated from the echo curves transmitted by all the slave devices or the data derived therefrom by the slave devices and from the echo curves detected by the master device.

A further aspect of the invention relates to a program element which, when executed on the processors of a fill level measurement system, as described above and in the following, instructs the fill level measurement system to carry out the method steps described above and in the following.

A final aspect of the invention relates to a computer-readable medium on which the program element described above is stored.

In this case, the program element may be, for example, part of software that is stored on a processor of the fill level measurement system. Furthermore, the program element can use the invention from the outset, or be a program element that causes an existing program element to use the invention by means of an update.

Embodiments of the invention are described in the following with reference to the drawings.

DETAILED DESCRIPTION OF EMBODIMENTS

Figure 1:
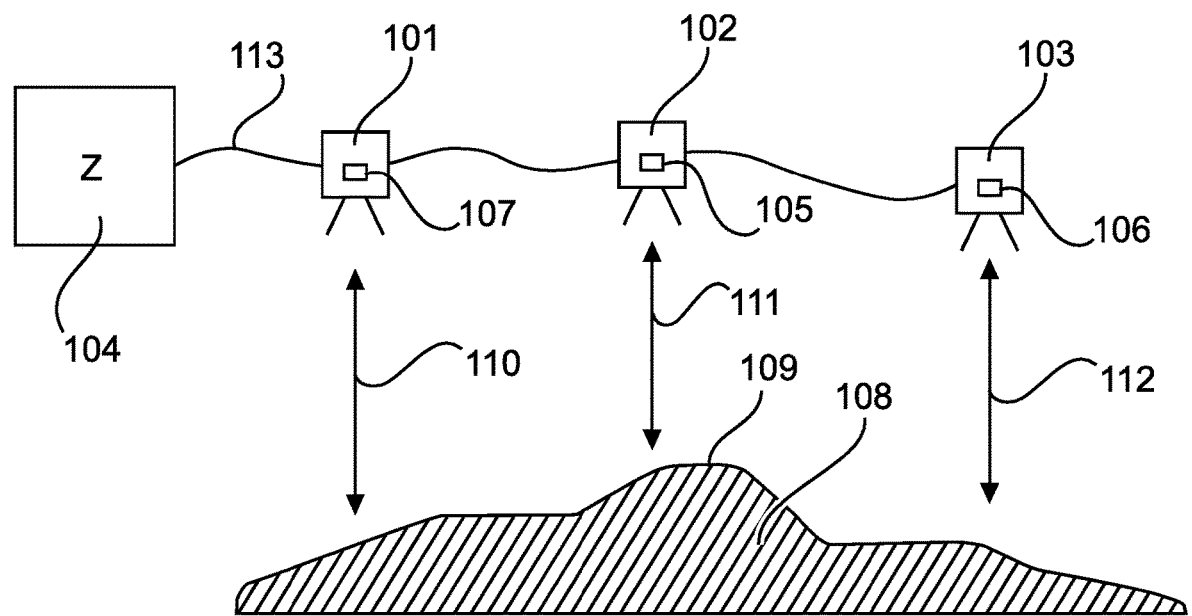
FIG. 1 shows a fill level measurement system according to an embodiment of the invention.

The views in the drawings are schematic and not to scale.

FIG. 1 shows a fill level measurement system according to an embodiment of the invention. The fill level measurement system comprises a fill level measurement device 101 designed as a master device. This is, for example, a fill level radar for contactless measuring. The master device is connected to an external energy source 104 via a line 113. The line 113 is used in particular to supply energy to the master device. However, data may also be transmitted between the apparatus 104 and the device via this line. In this case, the apparatus 104 may be a central control station or the like, and the line 113 may be designed as a two-wire line or four-wire line, for example. However, it is also possible that the master device 101 is supplied with energy via a wire and data is transmitted wirelessly between the master device and a control station.

A plurality of slave devices 102, 103 can be connected, for example in series, to the master device 101.

Each of the devices 101, 102, 103 may comprise a separate position sensor 107, 105, 106, for example in the form of a GPS receiver, by means of which the exact position of the device can be established. The relative position of the different devices to one another is particularly important for determining the topology and volume of the filling material 108. This relative position can be calculated by the master device 101 from knowledge of the position data of the individual devices.

Each of the devices comprises an antenna, which sends a measurement signal 110, 111, 112 towards the filling material surface 109. The measurement signal reflected from said surface is then received by the corresponding antenna and can subsequently be evaluated.

The measurement system shown in FIG. 1 may be designed so as to be modularly expandable. In other words, a number of slave devices, which number can be substantially freely selected by the customer, may be connected to the master device. In this case, the master recognises the number of connected slave devices and, by means of the data transmitted from the slave devices, the position thereof. From the data transmitted from the slave devices, the master device can determine the topology of the bulk material surface 109 or the volume of the bulk material 108, after said master device has carried out its own measurement.

A fill level measurement system that can be used flexibly by the customer is thus provided for the exact measurement of the surface contour and/or the volume of the bulk material. The fill level measurement device 101 designed as a master device takes over a master function and coordinates detecting measured data of the physically remote slave devices 102, 103.

The different slave devices 102, 103 comprise reduced hardware and software functionalities, in comparison with conventional fill level measurement devices, and can therefore be produced at a lower cost. However, they cannot be operated as stand-alone devices.

Interconnecting the devices makes it possible for signals, data and energy to be exchanged between the master device and the slave devices. The entire system is capable of detecting characteristic values of a bulk material surface and/or a volume of a medium 108 located beneath the measurement device. This detection is ultimately coordinated by the master device 101 and the evaluation of the measured data is carried out by said device completely or at least in part. The measured data can be pre-processed inside the corresponding slave device if the slave device is designed accordingly. Usually, however, it is the case that the master device 101 takes over as many tasks as possible, such that the slave devices 102, 103 can be produced as inexpensively as possible.

In particular, an interface 113 may be provided by means of which the detected characteristic values can be transmitted externally, for example to a central control station 104, said interface "hiding" the implementation of the measurement by means of a plurality of sensors. This means that, in principle, it makes no difference to the external unit 104 whether the fill level measurement system described above or a conventional measurement system designed to detect topology is connected thereto.

Accordingly, a scalable measuring apparatus is thus provided based on a plurality of fill level measurement devices for detecting at least one characteristic value of a surface or a volume, at least one master device interacting with at least one slave device in order to exchange signals, control commands, data and/or energy, and to provide a characteristic value to an external interface by using data from the at least one slave device.

The fill level measurement system consists of exactly one master device and at least one slave device, for example, the master device and the slave device having a physical distance to one another that is greater than the wavelength of the radar signal or ultrasound signal used for the fill level measurement. The fill level measurement devices are assembled above the filling material.

The master device first transmits energy and/or control signals to the at least one slave, whereupon said slave determines the distance from the filling material located thereunder using a radar signal (or ultrasound signal). The slave may be designed, for example, to first accumulate energy before the actual measurement, which energy is received by the slave from the master, for example via a two-wire interface.

During the actual measurement, the slave determines at least one echo curve, which said slave transmits to the master in an analogue, digital or digitally compressed form. The slave may also transmit only a characteristic value of the echo curve, for example the position of the filling material echo and optionally the amplitude thereof, to the master.

The master may be designed to actuate a plurality of slave devices by means of energy signals and/or control signals in parallel or temporally sequentially, transfer said devices into a measuring mode and receive the results of the measurements from said devices.

The master then determines characteristic values from the plurality of received individual measurement results, which characteristic values relate to the shape of the bulk material surface and/or the volume located beneath the sensors. Then, the master provides the results in an external interface that is central for the customer, for example by means of HART, Ethernet, an operating display, WLAN, Bluetooth, a smartphone app, etc.

The master may be designed as a two-wire sensor and likewise supplies all the slave devices with energy. However, the slave devices may also obtain their energy independently, for example via an independent wire connection.

The communication between the master and slaves can take place in a time-controlled or event-driven manner. For example, in the latter case, it may be provided that the slave sends new data to the master only if the fill level has changed by a specific amount since the last measurement, for example by 2 cm. Both wired analogue and/or digital means and wireless connection means are possible communication means.

Figure 2:
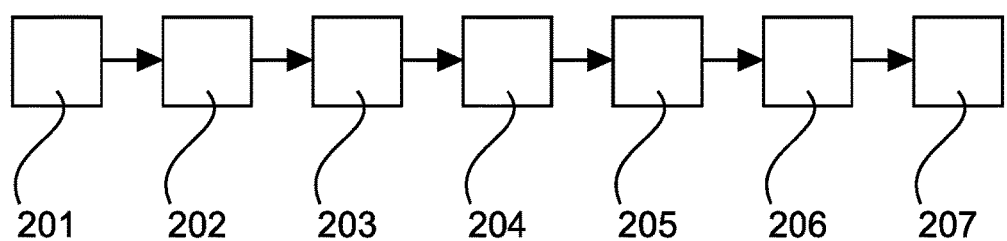
FIG. 2 is a flow diagram of a method according to an embodiment of the invention.

FIG. 2 is a flow diagram of a method according to an embodiment of the invention. In step 201, a plurality of slave devices are connected to a master device and are put into operation. In step 202, the slave devices measure their current position and transmit the corresponding position data to the master device, which calculates the relative positions of the different devices to one another from the position data. In step 203, the master device transmits control signals to the slave devices in order to control said devices and trigger the different fill level measurements. In step 204, both the master device and the various slave devices each receive an echo curve, from which the distance between the master device or the corresponding slave device and the filling material surface can be determined. The echo curves detected by the slave devices are transmitted to the master device in step 205. Alternatively, each slave device may pre-process the received echo curve and transmit only corresponding pre-processed data to the master device. In particular, it may be provided that this transmission of data only takes place if the data have changed sufficiently significantly in comparison with a previous measurement. This can reduce the data transfer.

In step 206, the topology of the filling material surface and/or the volume of the filling material is finally calculated from the data transmitted from the slave devices to the master device or data derived therefrom and from the echo curve detected by the master device. The master device performs this calculation.

In step 207, the final result is transmitted to a central unit.

In addition, it should be pointed out that "comprising" and "having" do not preclude any other elements or steps and "a" or "one" does not preclude a plurality. Furthermore, it should be pointed out that features or steps that have been described with reference to one of the embodiments above can also be used in combination with other features or steps of other

The invention claimed is:

1. A fill level measurement system for determining a topology of a filling material surface or a volume of a filling material in a container, comprising:
 a first fill level measurement device, which is configured as a master device; and
 a second fill level measurement device, which is configured as a slave device having reduced hardware and software calculation functionalities compared to the master device and is to be connected to, and controlled by, the master device at a physical distance from the master device,
 wherein the master device is configured to transmit control signals to the slave device in order to control the slave device,
 wherein the slave device is configured to capture an echo curve, from which the distance between the slave device and the filling material surface can be determined, and to transmit the echo curve, or data derived therefrom, by the slave device to the master device, and
 wherein the master device is configured to capture an echo curve from which the distance between the master device and the filling material surface can be determined, and to calculate the topology of the filling material surface or the volume of the filling material from the echo curve transmitted from the slave device to the master device and from the echo curve captured by the master device.

2. The fill level measurement system according to claim 1,
 wherein the master device is connected to an external energy supply, in the form of a two-wire loop, and
 wherein the master device is configured to supply energy to the slave device.

3. The fill level measurement system according to claim 2,
 wherein the master device is configured to be the sole supplier of energy to the slave device.

4. The fill level measurement system according to claim 1,
 wherein at least one of the control signals is configured to initiate a measurement by way of the slave device.

5. The fill level measurement system according to claim 4,
 wherein the slave device is not configured to independently decide whether to carry out a measurement, but requires the corresponding control signal from the master device in order to initiate a measurement.

6. The fill level measurement system according to claim 1,
 wherein the slave device is configured to transmit an echo curve or data derived therefrom to the master device only if said slave device has established that the fill level has changed by more than a predetermined threshold value.

7. The fill level measurement system according to claim 1,
 wherein the master device and the slave device each comprise a position sensor from the data of which the positions of the devices can be determined, and
 wherein the slave device is configured to transmit its position data to the master device.

8. The fill level measurement system according to claim 7,
 wherein the master device is configured to receive the position data transmitted from all the slave devices and to take said position data into consideration when calculating the topology of the filling material surface or the volume of the filling material.

9. The fill level measurement system according to claim 1,
 wherein the slave device is configured to automatically determine and transmit its position data to the master device as soon as said slave device is connected to the master device and put into operation.

10. The fill level measurement system according to claim 1,
 wherein the fill level measurement devices are configured as radar devices.

11. The fill level measurement system according to claim 1,
 wherein the master device is configured to control the entire fill level measurement system.

12. A method for detecting a topology of a filling material surface or a volume of a filling material in a container, comprising:
 transmitting control signals to a plurality of slave devices by way of a master device in order to control the slave devices, each of the slave devices having reduced hardware and software calculation functionalities compared to the master device;
 capturing a first echo curve by the master device from which the distance between the master device and the filling material surface can be determined;
 capturing at least one second echo curve by the slave devices from which the distance between the corresponding slave device and the filling material surface can be determined;
 transmitting the at least one second echo curve or data derived therefrom, from the plurality of slave devices to the master device; and
 calculating, by the mater device, the topology of the filling material surface or the volume of the filling material from
  the at least one second echo curve or the data derived therefrom transmitted by the plurality of slave devices to the master device, and
  the first echo curve captured by the master device.

13. A non-transitory computer readable medium having stored thereon a program element which, when executed on the processors of a fill level measurement system, instructs the fill level measurement system to carry out a method comprising:
 transmitting control signals to a plurality of slave devices by way of a master device in order to control the slave devices, each of the slave devices having reduced hardware and software calculation functionalities compared to the master device;
 capturing a first echo curve by the master device from which the distance between the master device and the filling material surface can be determined;
 capturing at least one second echo curve by the slave devices from which the distance between the corresponding slave device and the filling material surface can be determined;
 transmitting the at least one second echo curve or data derived therefrom, from the plurality of slave devices to the master device; and
 calculating, by the mater device, the topology of the filling material surface or the volume of the filling material from the at least one second echo curve or the data derived therefrom transmitted by the plurality of slave devices to the master device, and
the first echo curve captured by the master device.

* * * * *